June 2, 1953  E. C. CUTLER  2,640,204
SLEEPING EQUIPMENT FOR USE IN COMBINATION
WITH MOTOR VEHICLES OF THE PLEASURE TYPE
Filed Jan. 6, 1948  4 Sheets-Sheet 1

INVENTOR.
Edmond C. Cutler.
BY Victor J. Evans & Co.
ATTORNEYS

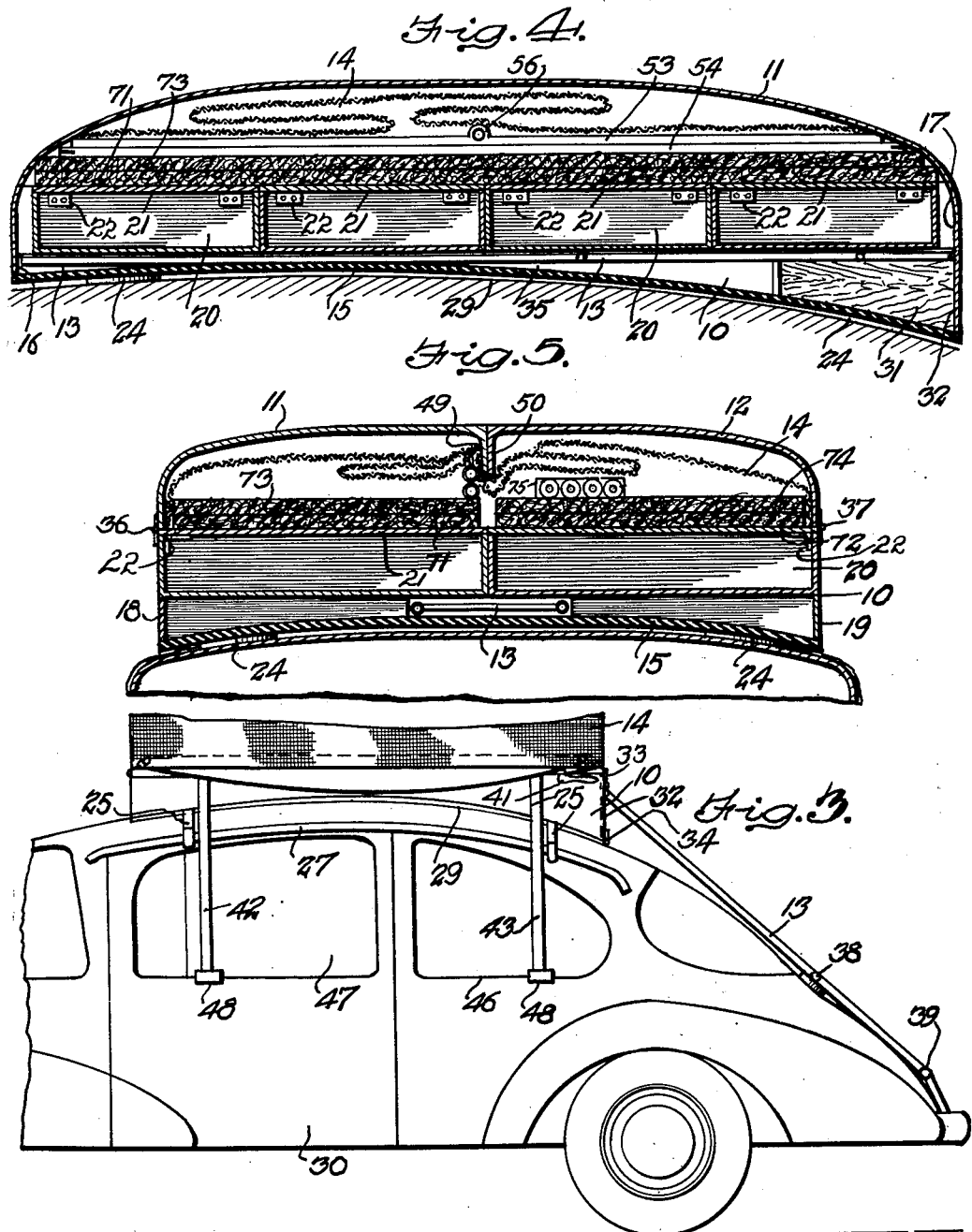

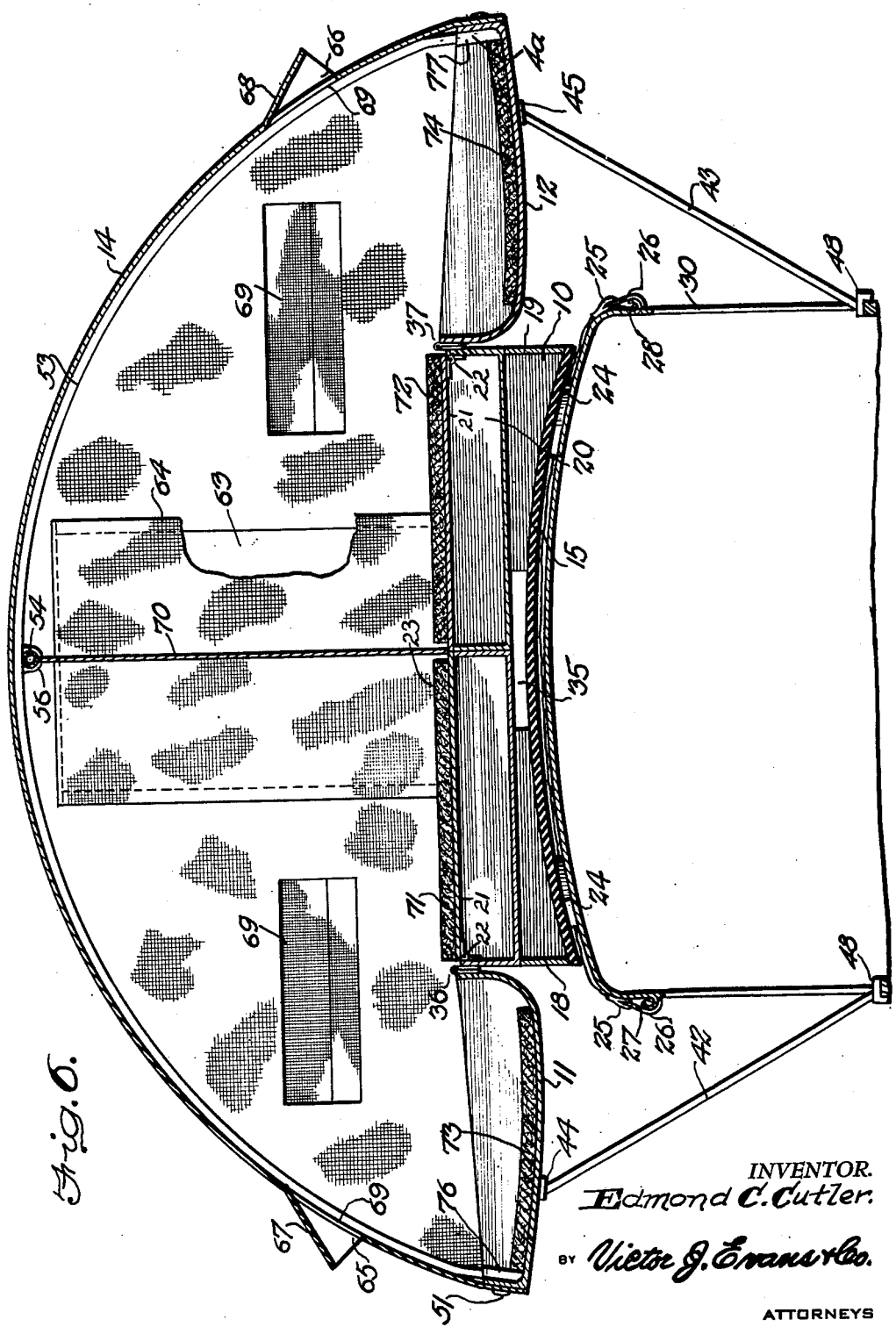

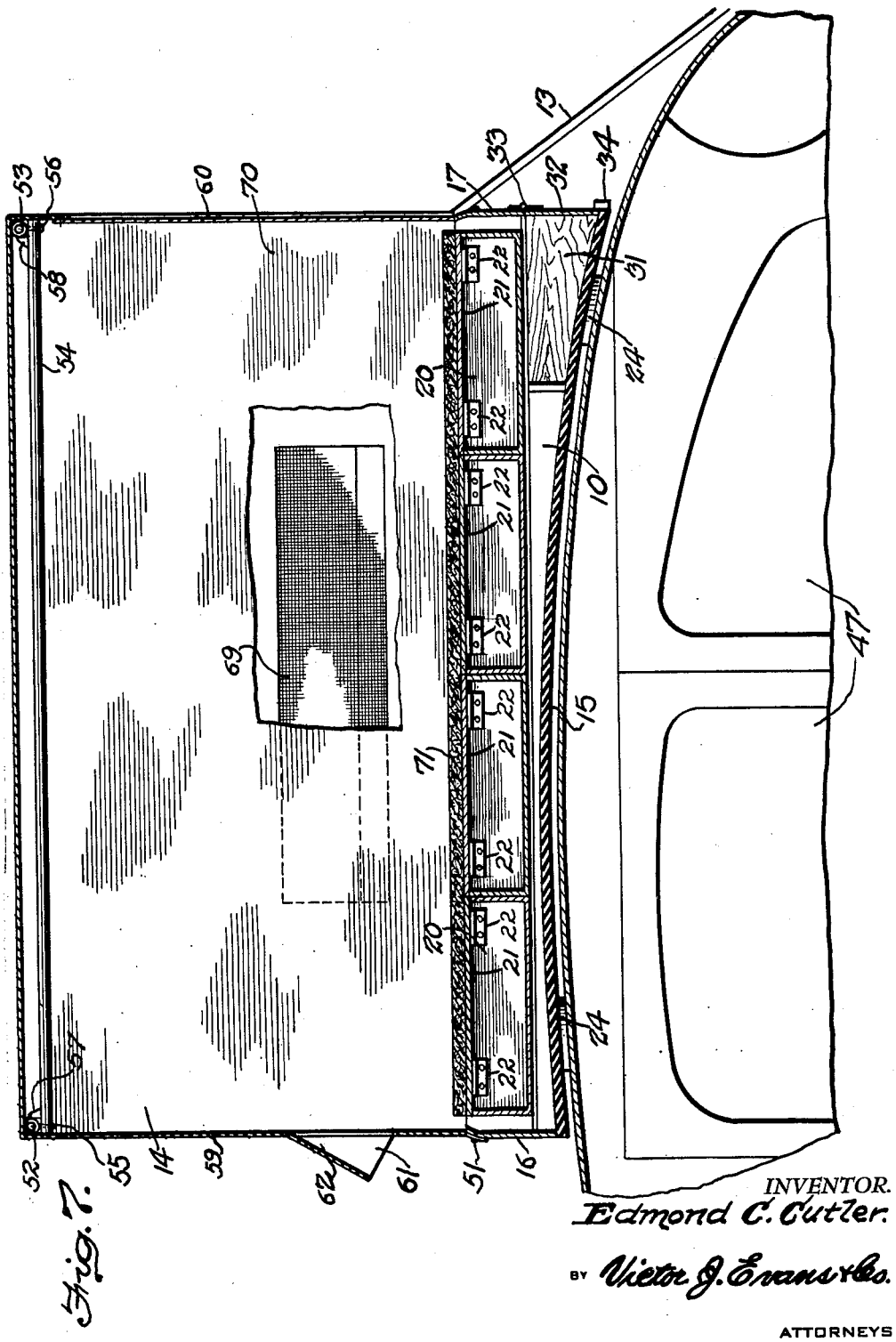

Patented June 2, 1953

2,640,204

UNITED STATES PATENT OFFICE 2,640,204

SLEEPING EQUIPMENT FOR USE IN COMBINATION WITH MOTOR VEHICLES OF THE PLEASURE TYPE

Edmond C. Cutler, Walpole, N. H.

Application January 6, 1948, Serial No. 668

1 Claim. (Cl. 5—119)

This invention relates to camping and particularly sleeping equipment for use in combination with motor vehicles of the pleasure type, and in particular a plurality of bed forming elements in a folding casing adapted to be positioned on the roof of a motor vehicle body in which the parts may readily be opened for use.

The purpose of this invention is to provide sleeping means for occupants of motor vehicles that may be used without lifting or carrying heavy parts and in which the occupants may rest comfortably.

Various types of motor vehicle beds and sleeping equipment have been provided for use with motor vehicles and trailers and some include beds mounted on the roof of the vehicle, but where such devices have been positioned on the roof they are cumbersome and unsightly and therefore undesirable for general use. With this thought in mind this invention contemplates a comparatively thin compact housing that may fit snugly on the roof of a motor vehicle of the pleasure type in which the upper part is formed in two sections hinged at the sides wherein the sections may be opened outwardly with each forming a single bed or cot and with a double bed provided in the base of the housing.

The object of this invention is to provide means for forming a casing having a plurality of beds therein so that it may be carried on the roof of a motor vehicle without materially changing the appearance of the vehicle.

Another object of the invention is to provide means for carrying a plurality of beds on the roof of a motor vehicle which is adapted for use with vehicles of different types and designs.

Another object of the invention is to provide sleeping equipment adapted to be installed on the roof of a pleasure car that may be used with the vehicle in motion or with the vehicle stationary.

Another object is to provide sleeping equipment adapted to be installed and used on the roof of a motor vehicle which includes a plurality of beds and a complete housing therefor.

A further object of the invention is to provide sleeping equipment adapted to be carried and used on the roof of a motor vehicle which is of a simple and economical construction.

With these and other objects and advantages in view the invention consists of the new and novel combination, construction, and arrangement of parts as hereinafter more fully described, set forth in the claim appended hereto, and disclosed in the accompanying drawings, forming part hereof, wherein:

Figure 3 is a view similar to that shown in Figure 1, with parts broken away, showing the device open and illustrating the supporting elements.

Figure 4 is a longitudinal section through the casing taken on line 4—4 of Figure 2.

Figure 5 is a cross section through the device taken on line 5—5 of Figure 1 showing the parts folded.

Figure 6 is a similar section showing the parts open and with the top set up ready for use.

Figure 7 is a longitudinal section through the device with parts broken away and also showing the top set up in the position in which it is used.

Figure 1:
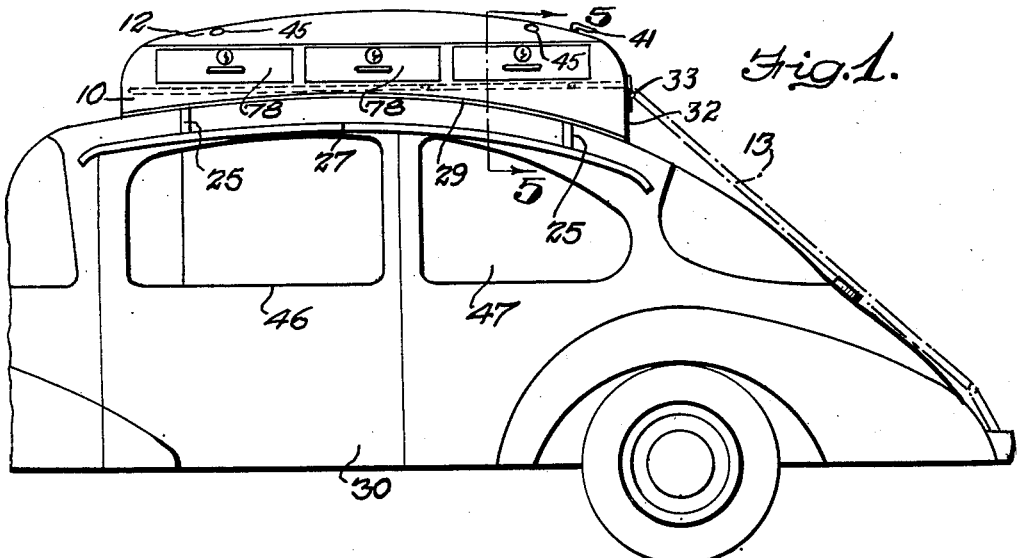
Figure 1 is a view illustrating the car sleeper or sleeping equipment casing in the closed position, and positioned on the roof of a motor vehicle of the pleasure type.
Figure 2:
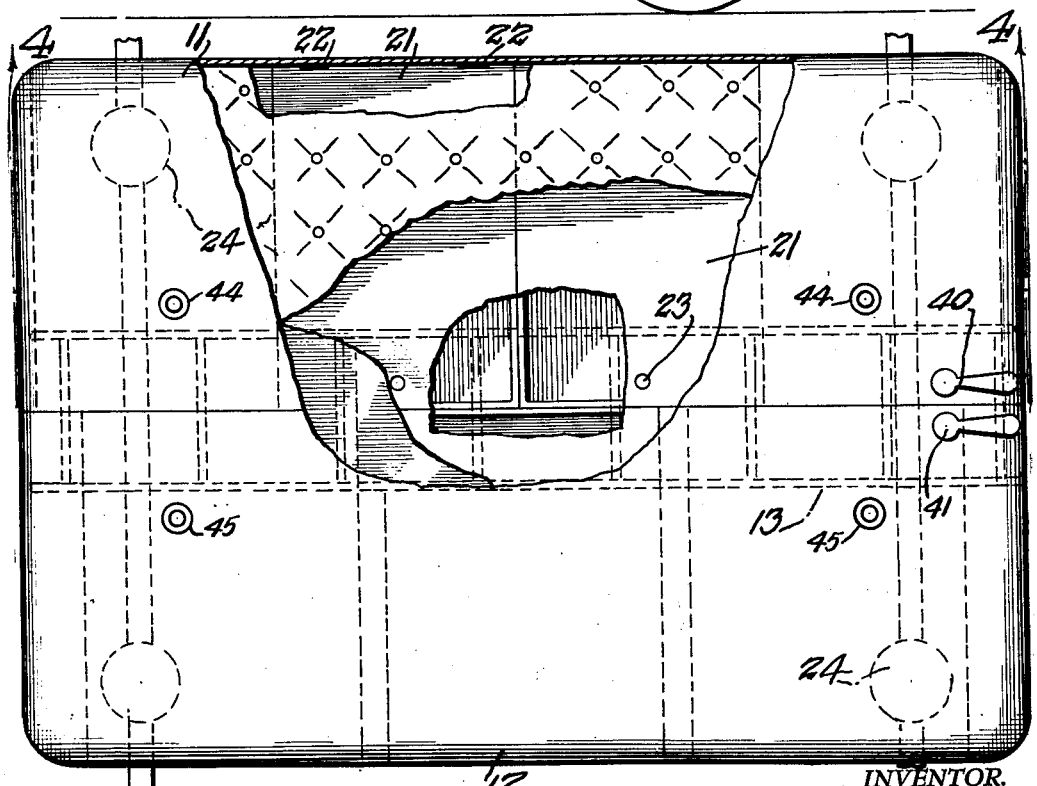
Figure 2 is a plan view of the casing separated from the vehicle and with part broken away showing the inner construction thereof.

Referring now to the drawings wherein like reference characters indicate corresponding parts the car sleeping equipment of this invention includes a box-like base 10, hinged cover sections 11 and 12, a ladder 13, and a top 14.

The base 10 is formed with an arcuate base plate 15, end walls 16 and 17, side walls 18 and 19, and the upper part thereof is provided with a plurality of compartments 20 having covers 21 which are connected to the side walls by hinges 22 and provided with knobs 23, as shown in Figure 4. The compartments 20 may be formed as illustrated in Figures 4, 5, 6, and 7, or may be provided as drawers, as may be desired. The lower surface of the base plate 15 may be provided with vacuum cups or resilient pads 24, and straps 25 with fasteners 26 at the ends thereof may be provided at the sides wherein the fasteners may grip the drain troughs 27 and 28 at the sides to secure the base in position upon a roof 29 of a vehicle 30, as shown in Figure 6. The base is also provided with a storage compartment 31 at the rear and this compartment is closed by a door 32 which is held by a hinge 33 at the upper end, and a latch 34 at the lower edge. The base is also formed with a centrally disposed longitudinally extending recess 35 in which the ladder 13 is stored for traveling.

The upper sections or body members 11 and 12 are connected to the side walls 18 and 19 by hinges 36 and 37 and when these sections are folded as shown in Figures 4 and 5 the casing is substantially sealed and a comparatively thin compact housing is provided, as shown in Figure 1. When it is desired to use the device the ladder 13, which is provided with swivel joints 38 and 39, is drawn outward as shown in Figure 3, so that one may climb up to the casing and open the sections 11 and 12 by the handles 40 and 41. The sections are supported in substantially horizontal positions by struts or braces 42 and 43, the upper ends of which are held in sockets 44 and 45, and the lower ends positioned on the edges 46 of windows 47 through pads 48.

The edges of the sections 11 and 12 are formed with flanges 49 and 50 and the lower edges of the top 14 are held to these flanges at the sides by snap fasteners 51. The top is supported by arcuate rods 52 and 53 at the ends and a central longitudinally disposed rod 54, the ends of which are positioned in rings 55 and 56 on the rods 52 and 53, respectively, and the upper surface of the rod 54 is provided with lugs 57 and 58 that hold the ends separated and the top in tension. The top 14 is provided with ends 59 and 60, and the end 59 is provided with a window 61, having a flap 62, while the end 60 is formed with a door 63 that is covered with a flap 64. The sides of the top are also provided with windows 65 and 66 having flaps 67 and 68, respectively, and the windows may have screens 69 therein.

A central partition which is fabricated of a flexible material such as canvas 70 may be suspended from the rod 54, as shown in Figure 6 when it is desired to divide the device into compartments or rooms. The base 10 is provided with mattresses 71 and 72, and the sections 11 and 12 are also provided with mattresses 73 and 74. The mattresses in the sections 11 and 12 slope upwardly from the center so as to prevent persons sleeping thereon rolling off of the outer edges.

The rods and braces are stored in the casing as shown by the numeral 75, and when it is desired to set up the unit the sections 11 and 12 are opened, the side braces placed in position, as described, and the end rods 52 and 53 set upright as shown in Figure 6 with the ends thereof inserted in sockets 76 and 77. The center rod 54 is then affixed, and the top stretched over the rods with the edges thereof secured by snap fasteners 51, as described.

The compartments 20 are provided with hinged covers 21 so that they may be opened from the inside of the device, and the outer ends of these compartments are also provided with doors 78, as shown in Figure 1, which provide access to the compartments from the outside of the casing.

With the parts arranged in this manner this sleeping device may remain on the vehicle and may be carried continuously, or may just be positioned on the vehicle and used for camping trips or the like. It may also be used as a tent for sleeping or other purposes while in place on the roof of the vehicle, or it may be removed and used on the ground, or may be placed on a trailer or on wheels and drawn behind the vehicle.

It will be understood that other modifications may be made in the design and arrangement of the parts without departing from the spirit of the invention.

What is claimed is:

In a sleeping compartment for mounting on the top of a vehicle, a base including an arcuate base plate, vertically disposed end walls extending upwardly from said plate, vertically disposed spaced parallel side walls extending upwardly from said plate and secured thereto, there being a plurality of spaced parallel holding compartments arranged in said base, vacuum cups depending from the bottom of said base for engaging the top of the vehicle, straps having one end connected to said base and having fasteners on the other ends for engaging drain troughs of the vehicle, there being a storage compartment arranged at the rear of said base, a hinged door for closing said storage compartment, said base being provided with a centrally disposed, longitudinally extending recess for receiving therein a ladder, members hingedly connected to the upper edge of said side walls, handles connected to said members for manually swinging said members, sockets secured to the exterior surface of said members, struts having their upper ends arranged in engagement with said sockets and their lower ends engaging the windows of the vehicle, flanges arranged on each of the body members, a flexible cover detachably connected to said flanges, a plurality of arcuately shaped parallel rods supporting said cover, and spaced parallel end pieces formed integrally with said cover and extending therefrom.

EDMOND C. CUTLER.

References Cited in the file of this patent

UNITED STATES PATENTS

| Number | Name | Date |
|---|---|---|
| 1,285,794 | Reid | Nov. 26, 1918 |
| 1,363,437 | Robertson | Dec. 28, 1920 |
| 1,466,224 | Hans | Aug. 28, 1923 |
| 1,707,270 | Lichtenberg | Apr. 2, 1929 |
| 1,881,482 | Gilkison | Oct. 11, 1932 |
| 1,984,681 | Jackson | Dec. 18, 1934 |
| 2,152,713 | Stewart | Apr. 4, 1939 |
| 2,291,900 | Jimes | Aug. 4, 1942 |

FOREIGN PATENTS

| Number | Country | Date |
|---|---|---|
| 352,534 | Great Britain | July 10, 1931 |